F. LOEDIGE.
JOURNAL BOX LUBRICANT DEVICE.
APPLICATION FILED JUNE 18, 1912.
1,044,207.  Patented Nov. 12, 1912.
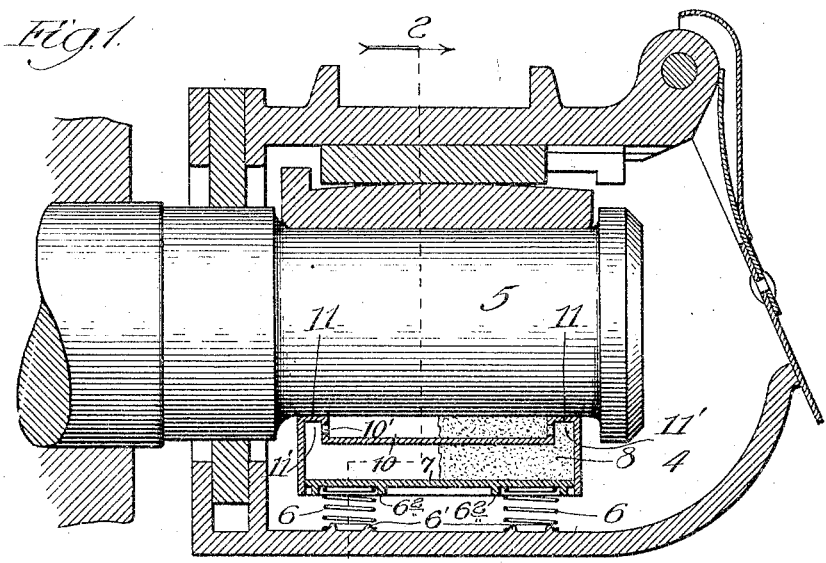
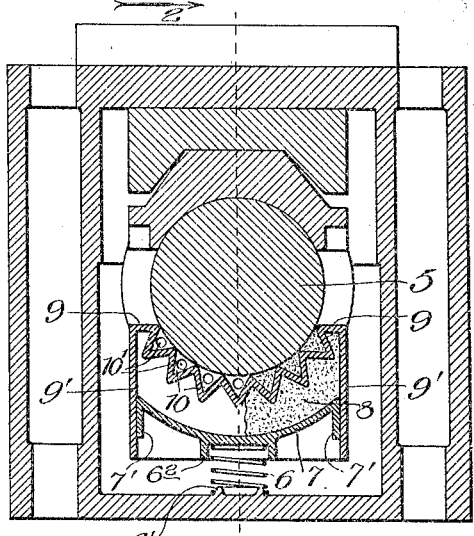
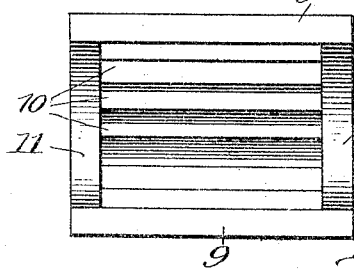
Witnesses  
Inventor,  
Frederick Loedige,

UNITED STATES PATENT OFFICE.

FREDERICK LOEDIGE, OF CHICAGO, ILLINOIS, ASSIGNOR OF ONE-HALF TO EVAN H. WADE, OF CHICAGO, ILLINOIS.

JOURNAL-BOX LUBRICANT DEVICE.

1,044,207.　　　　Specification of Letters Patent.　　Patented Nov. 12, 1912.

Application filed June 18, 1912. Serial No. 704,437.

*To all whom it may concern:*

Be it known that I, FREDERICK LOEDIGE, a citizen of the United States, residing at Chicago, in the county of Cook and State of Illinois, have invented a new and useful Improvement in Journal-Box Lubricant Devices, of which the following is a specification.

My present invention relates to an improvement in journal-box lubricant devices of the kind shown and described in my application, Serial No. 692,374, filed April 22nd, 1912, in which the plate interposed between a spring-supported lubricant-holder and journal, is longitudinally corrugated to form a series of trough-like lubricant-chambers provided with rows of perforations in their bases, which latter bear against the lubricant in the holder while the upper edges of the corrugations contact with the journal.

The object of my present improvement is to simplify the construction thus outlined and thereby adapt it for use, more particularly, on the shorter types of journals, by providing the perforations, for admitting the lubricant from the supply in the holder into the trough-like chambers, at the ends of the latter.

In the accompanying drawing, Figure 1 is a view in longitudinal sectional elevation of a journal-box equipped with my improved construction of lubricant device, the section being taken on line 1, Fig. 2; Fig. 2 is a section on the irregular line 2—2, Fig. 1, and Fig. 3 is a plan view of the corrugated plate.

The journal-box 4 and journal 5 therein may be of any desired construction, with seats 6' formed on the bottom of the box for the lower ends of two spiral springs 6, 6, confined at their upper ends in seats $6^2$ on the bottom of a follower-plate 7. This plate is shown of dished shape and provided with depending guide-flanges $7^1$ on its lateral edges; and it forms the spring-supported holder for the lubricating grease 8. A plate 9 of concavo-convex form, seating upon the grease 8, is provided with depending guide-flanges $9^1$ to overlap the holder 7, and is formed with a series of longitudinal corrugations of the preferred V-shape in cross-section illustrated, to produce parallel trough-like chambers 10 extending throughout the length of the plate for contacting along their upper edges with the journal-surface, to which the plate conforms, and penetrating at their lower edges the grease in the holder. End-walls 11 connect the depending flanges and conform to the cross-sectional shape of the plate; and the journal bears against them as well as against the apexes of the plate-corrugations, the walls also preventing grease from escaping at the ends of the chambers and being wasted by dropping into the journal-box.

The foregoing description applies both to the construction of said application and to the present construction. Instead, however, of providing lines of perforations in the lower apexes of the chambers 10, I provide, in the present construction, perforations $10^1$ only in the inner faces of the walls 11 at the ends of the chambers, which walls are hollow, to become filled with the lubricant, and have depending outer faces to overlap the ends of the plate 7, for guiding purposes.

With the lubricant device in place in a journal-box and containing grease on the follower-plate, the pressure of the springs 6 forces the grease into the curved recesses $11^1$ under and formed by the hollow walls, and from these recesses the grease works through the perforations $10^1$ into the chambers 10 from their opposite ends, keeping the chambers filled with the lubricant for the journal.

I realize that considerable variation is possible in the details of construction thus specifically shown and described, and I do not intend by illustrating a single, specific or preferred form to limit my invention thereto, my intention being in the following claims to claim protection upon all the novelty there may be in the device as broadly as the state of the prior art will permit.

What I claim as new and desire to secure by Letters Patent is—

1. In combination with a journal, a journal-box, and a lubricant device comprising a lubricant-holder spring-supported to extend in the box below the journal and tend to rise toward it, and a concavo-convex plate provided with a series of chamber-forming corrugations having nd-walls containing openings for directing through them lubricant into the chambers lengthwise thereof, said plate being interposed between said holder and journal to bear at the bases of the corrugations against the lubricant and contact along their upper edges and at said walls with the journal.

2. In combination with a journal, a journal-box, and a lubricant device comprising a lubricant-holder spring-supported to extend in the box below the journal and tend to rise toward it, and a concavo-convex plate provided with a series of chamber-forming corrugations having hollow end-walls containing openings in their inner faces for directing lubricant into the chambers lengthwise thereof, said plate being interposed between said holder and journal to bear at the bases of the corrugations against the lubricant and contact along their upper edges and at said walls with the journal.

3. In combination with a journal, a journal-box, and a lubricant device comprising a lubricant-holder spring-supported to extend in the box below the journal and tend to rise toward it, and a longitudinally-corrugated concavo-convex plate forming a series of trough-like lubricant-chambers, said plate having depending side-walls, and hollow walls at the ends of said chambers, forming bearings for the journal, and provided with openings in their inner faces for directing lubricant into the chambers lengthwise thereof and with outer faces overlapping the ends of said plate.

FREDERICK LOEDIGE.

In presence of—
  NELLIE B. DEARBORN,
  AMY C. FISCHER.